US007219683B2

United States Patent
Furuya et al.

(10) Patent No.: US 7,219,683 B2
(45) Date of Patent: May 22, 2007

(54) CUT VALVE WITH CHECK VALVE

(75) Inventors: Masashi Furuya, Kanagawa (JP); Shinichi Matsuo, Kanagawa (JP)

(73) Assignee: Piolax Inc., Yokohama-shi, Kanagawa-ken (JP)

( * ) Notice: Subject to any disclaimer, the term of this patent is extended or adjusted under 35 U.S.C. 154(b) by 125 days.

(21) Appl. No.: 10/975,950

(22) Filed: Oct. 29, 2004

(65) Prior Publication Data
US 2005/0092364 A1 May 5, 2005

(30) Foreign Application Priority Data
Oct. 31, 2003 (JP) ............................ P2003-371945

(51) Int. Cl.
*F16K 17/196* (2006.01)
(52) U.S. Cl. .................. 137/202; 137/43; 137/512.2; 137/198; 137/493.3
(58) Field of Classification Search ............. 137/202, 137/43, 512.2, 198, 493.1, 493.3, 493.4, 137/493.5
See application file for complete search history.

(56) References Cited
U.S. PATENT DOCUMENTS 2,406,502 A * 8/1946 Lines .................... 220/203.26
5,402,818 A * 4/1995 Kasugai et al. ............. 137/198
5,439,023 A * 8/1995 Horikawa .................. 137/202
5,582,198 A * 12/1996 Nagino et al. ............... 137/43
5,836,341 A * 11/1998 Ayers et al. ................ 137/202
2004/0025937 A1* 2/2004 Kojima ..................... 137/202
2005/0028869 A1* 2/2005 Roth et al. ............... 137/493.4

* cited by examiner

*Primary Examiner*—Eric Keasel
*Assistant Examiner*—Craig Schneider
(74) *Attorney, Agent, or Firm*—McGinn IP Law Group, PLLC

(57) ABSTRACT

A cut valve with a check valve includes a body case, a cap member, positive and negative pressure valves, and first and second springs. The body case defines a vent hole. The cap member is fitted to an upper portion of the body case. The positive pressure valve is made of resin, defines an opening part, and is disposed to be contactable with and separable from the vent hole from above. The first spring is disposed on the positive pressure valve and presses the positive pressure valve in a direction in which the positive pressure valve closes the vent hole. The negative pressure valve is made of resin and is disposed to be contactable with and separable from the opening part from below. The second spring presses the negative pressure valve in a direction in which the negative pressure valve closes the opening part.

5 Claims, 8 Drawing Sheets

CUT VALVE WITH CHECK VALVE

BACKGROUND OF THE INVENTION

1. Field of the Invention

The present invention relates to a cut valve with a check valve attached to a fuel tank of, for example, an automobile and including a cut valve for preventing fuel, which is shaken by a turn and a tilt of the automobile, from leaking out of the tank, and a check valve for feeding fuel vapor to a canister according to the internal pressure of the tank.

2. Description of the Related Art

A cut valve for preventing fuel, which is shaken by a turn and a tilt of an automobile, from leaking out of a fuel tank of the automobile is attached thereto. Further, a communication hole opened and closed by this cut valve is connected through a check valve to a canister disposed outside the tank. Furthermore, the check valve is connected through a pipe to the canister.

Especially, in the case of a resin fuel tank, a cut valve is attached to an opening portion defined in an upper wall of the tank by, for example, welding. Further, a communication hole of this cut valve is connected to the check valve through a pipe. Furthermore, the check valve is connected to a canister through a pipe.

However, the aforementioned structure including the valves and the pipes needs to connect the cut valve and the check valve and to also connect the check valve and the canister. Thus, a piping operation is cumbersome. Moreover, because the cut valve and the check valve should be attached to different places, an operation of attaching the valves thereto is time-consuming. Additionally, because this structure needs two valves, the number of components increases, so that the management of components is troublesome, and that the cost of the components becomes high.

Meanwhile, U.S. Pat. No. 5,582,198 discloses a fuel shut-off device, which is disposed in a fuel tank, for bidirectionally passing fuel vapor between the fuel tank and an external device and for preventing fuel liquid from flowing out to the external device. A partition wall is provided in a case body defining a first connecting port that communicates with the exterior. A second connecting port is defined in this partition wall. A valve chamber is formed between the partition wall and the first connecting port. This valve chamber accommodates a first valve member pressed by a first valve member spring in a direction, in which the first valve member closes the second connecting port, and also accommodates a second valve member pressed by a second valve member spring in such a way as to close a communication hole, which is opened in the first valve member, from a partition wall side. Also, a float valve for opening and closing the second connecting port is provided in a part of the case body, which is lower than the partition wall.

SUMMARY OF THE INVENTION

However, because of the facts that the partition wall is provided in the case body, that the first valve member and the second valve member are accommodated in a part being higher than the partition wall, and that the float valve is accommodated in the part being lower than the partition wall, the fuel shut-off device disclosed in U.S. Pat. No. 5,582,198 needs to fit the partition wall into the case body and also fix the partition wall to the case body by means, such as ultrasonic welding, after the first valve member and the second valve member, and the first valve member spring and the second valve member spring, which are used for pressing the members, are incorporated into the case body. Thus, it is necessary to perform the ultrasonic welding in process of an operation of assembling the case body. Furthermore, it is necessary for accurately exerting the pressing forces of the first valve member spring and the second valve member spring to precisely control pushed amounts of the valve members in an ultrasonic welding time. Therefore, this device has a problem in that the operation of assembling the case body takes time and trouble.

Further, because at least one of the first valve member and the second valve member is formed of a rubber in the fuel shut-off device disclosed in U.S. Pat. No. 5,582,198, the manufacturing cost thereof rises. There is the possibility of swelling and deteriorating the rubber due to the fuel.

Accordingly, an object of the invention is to provide a cut valve with a check valve, which is enabled to easily and efficiently perform an operation of assembling the body thereof and to reduce the manufacturing cost thereof and which excels in durability thereof.

To achieve the foregoing object, according to a first aspect of the invention, a cut valve with a check valve includes a body case, a cap member, a positive pressure valve, a first spring, a negative pressure valve, and a second spring. The body case defines a vent hole and accommodates therein a float valve for opening and closing the vent hole. The cap member is fitted to an upper portion of the body case and includes a connection pipe communicating with the vent hole and protruding from an outer wall thereof. The positive pressure valve is made of resin, defines an opening part, and is disposed to be contactable with and separable from the vent hole from above. The first spring that is disposed on the positive pressure valve and presses the positive pressure valve in a direction in which the positive pressure valve closes the vent hole. The negative pressure valve is made of resin and is disposed to be contactable with and separable from the opening part of the positive pressure valve from below. The second spring presses the negative pressure valve in a direction in which the negative pressure valve closes the opening part of the positive pressure valve.

With this configuration, the assembly of the body can be performed by attaching the cap member to the upper portion of the body case in a state where the float valve is accommodated in the body case and the positive and negative pressure valves and the first and second springs used for pressing the pressure valves are disposed on the upper end of the body case. Thus, an operation of assembling the body can be performed easily and efficiently. Further, because the positive pressure valve and the negative pressure valve are made of a resin, the cost of the material can be reduced. Furthermore, because the swelling due to fuel does not occur, stable performance can be maintained over a long period of time. Additionally, because the body case and the cap member are configured separately from each other, the body case may be formed of a material such as polyamide or polyacetal, which excels in dimensional stability, strength and fuel nonpermeability, and the cap member may be made of a material, which can be welded to the fuel tank.

According to a second aspect of the invention, in the first aspect, the cut valve with the check valve further includes a lid that receives the first spring. The case body includes a cylindrical tube portion that is erected on an upper surface of the body case to surround the vent hole. The positive and negative pressure valves are accommodated in the tube portion. The lid is attached to an upper end of the tube portion.

With this configuration, a compressed length of the first spring in an installed state can accurately be set by disposing the positive pressure valve, the negative pressure valve, and the first spring and the second spring respectively used for pressing the pressure valves in the tube portion of the body case, and by attaching the lid to the upper end of the tube portion. Thus, the pressing force of the positive pressure valve can precisely be set. Also, because the assembly of the valve is completed only by preliminarily attaching the positive pressure valve, the negative pressure valve, and the first spring and the second spring respectively used for pressing the pressure valves to the body case and by then fitting the cap member thereto, the assembling workability of the valve can favorably be enhanced still more.

According to a third aspect of the invention, in the second aspect, a plurality of notch portions are defined in the upper end of the tube portion at intervals in a circumferential direction.

With this configuration, the notch portions serve as paths through which fuel vapor passes. Thus, a fuel-vapor pressure loss caused during the passage of fuel vapor therethrough can be reduced.

According to a fourth aspect of the invention, in the second aspect, the lid is made of elastomer. The lid airtightly seals a gap between an outer periphery of the tube portion and an inner periphery of the cap member.

With this configuration, the lid is made of an elastomer, and the gap between the outer periphery of the tube portion and the inner periphery of the cap member is airtightly sealed by this lid. Thus, the lid also can have an effect of sealing. The number of components thereof can be reduced. The manufacturing cost thereof can be lowered.

According to fifth aspect of the invention, in the second aspect, the cut valve with the check valve further includes a seal member. The lid closes the upper end of the tube portion. The tube portion defines a communication hole in a peripheral wall thereof to communicate with an opening part of the connection pipe of the cap member. The seal member seals a peripheral edge between the communication hole of the tube portion and the opening part of the connection pipe.

With this configuration, the seal member, which has a size sufficient to the extent that the seal member surrounds the peripheral edges of the communication hole of the tube portion and the opening portion of the connecting pipe, can seal between the body case and the cap member. Thus, the cost of the material can be reduced.

According to a sixth aspect of the invention, in the fifth aspect, the body case includes an arm member, which protrudes from the upper surface thereof, on an outer side of the communication hole of the tube portion. An inner periphery of the cap member defines an insertion groove to which the arm member is inserted. When the arm member is inserted into the insertion groove, the seal member closely contacts with the peripheral edge of the communication hole of the tube portion and the peripheral edge of the opening part of the connection pipe.

With this configuration, the arm member protruding from the upper surface of the body case is inserted to the inner periphery of the cap portion. Thus, the seal member can be brought into close contact with the peripheral edge of the communication hole of the tube portion and with that of the opening portion of the connecting pipe. Thus, the sealing of both the communication hole and the opening portion can surely be achieved. Consequently, leakage of fuel vapor can reliably be prevented.

The cut valve with the check valve according to embodiments of the invention is configured by disposing the positive pressure valve, the negative pressure valve, and the springs for pressing the pressure valves on the body case, and by making the pressure valves and the springs to be covered with and fitted into the cap member. Thus, an operation of assembling the body thereof can be easily and efficiently performed. Also, because the positive pressure valve and the negative pressure valve are made of resin, the cost of materials thereof can be reduced. Thus, stable performance thereof can be maintained for a long time. Furthermore, the body case and the cap member are constituted separately from each other. Thus, the body case may be formed of materials, for example, polyamide and polyacetal, which excel in dimensional stability, strength and fuel nonpermeability. The cap member may be made of materials, for instance, polyethylene and polypropylene, which can be welded to the fuel tank.

DETAILED DESCRIPTION OF THE PREFERRED EMBODIMENT

Hereinafter, embodiments of the invention will be described with reference to the accompanying drawings. FIGS. 1 to 5 show a cut valve with a check valve according to an embodiment of the invention.

Figure 1:
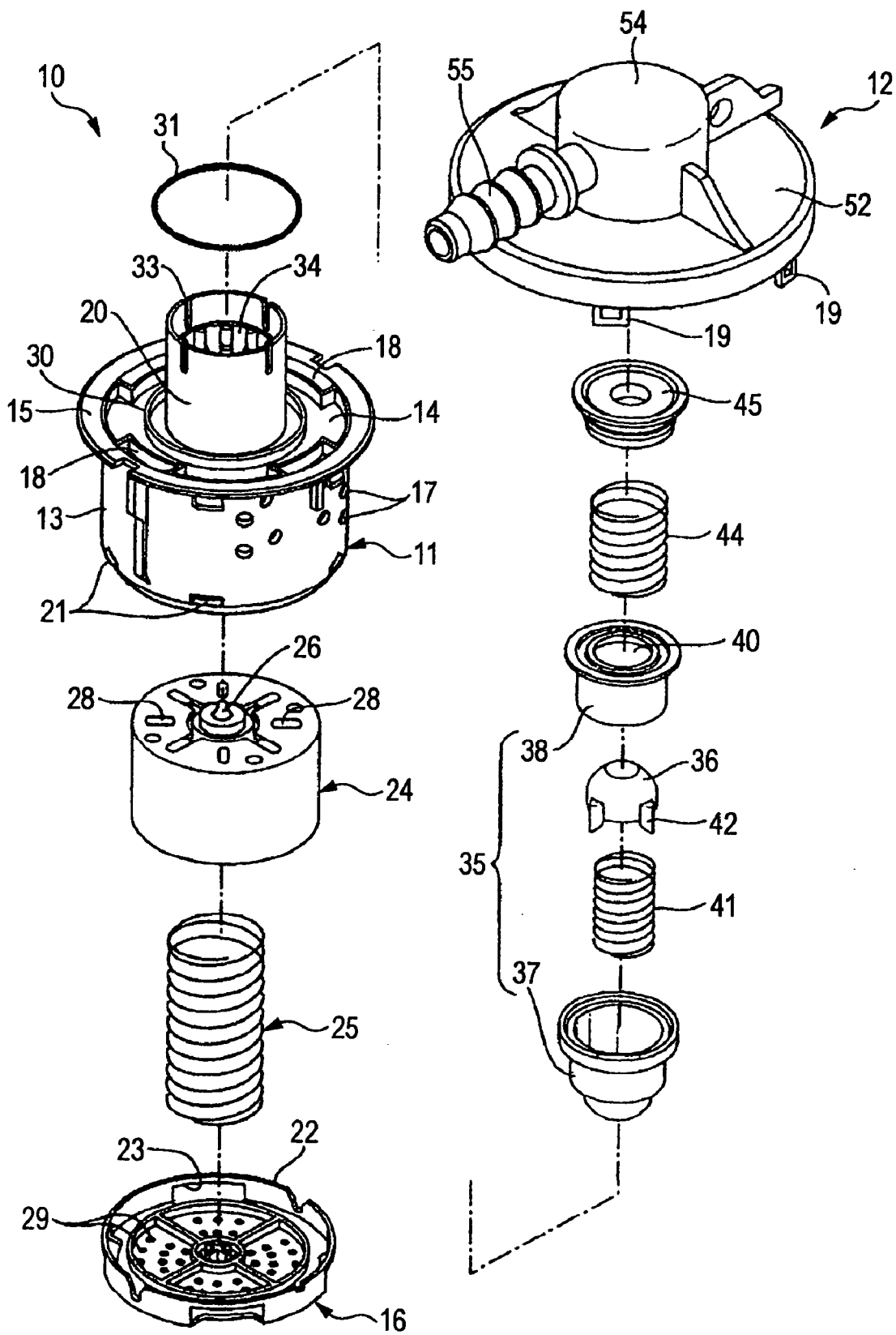
FIG. 1 is an exploded perspective view illustrating a cut valve with a check valve according to an embodiment of the invention.

As shown in FIG. 1, a cut valve 10 with a check valve mainly includes a body case 11 and a cap member 12. The body case 11 has a cylindrical peripheral wall 13 and a top wall 14. A flange portion 15 is formed along the peripheral edge of the top wall 14. The bottom surface of the peripheral wall 13 is opened. A bottom cover 16 (described later) is fitted to this bottom surface of the peripheral wall 13. Plural through holes 17 are defined in the peripheral wall 13. The through holes 17 serve as holes through which fuel vapor and fuel pass. Plural insertion holes 18 are defined in a continuous connection portion between the flange portion 15 and the top wall 14 at predetermined intervals in a circumferential direction. These insertion holes 18 serve as portions, in each of which engaging-pieces 19 of a cap member 12 (described later) are inserted. Claw portions (not shown)

protruding from the peripheral wall 13 are formed on the surface of a lower portion of the insertion holes 18. Further, the engaging pieces 19 of the cap member 12 are inserted into the insertion holes 18 and engaged with the claw portions (not shown), respectively, so that the cap member 12 is fitted to the top portion of the body case 11.

A tube portion 20 is erected on the central portion of the top surface of the body case 11. Meanwhile, plural claw portions 21 are formed along the bottom edge portion of the peripheral wall 13 at predetermined intervals in a circumferential direction. Engaging holes 23 associated with these claw portions 21 are defined in the peripheral wall 22 of the bottom cover 16. When the bottom surface of the peripheral wall 13 of the body case 11 is covered with the bottom cover 16, the claw portions 21 are fitted into the engaging holes 23, respectively, so that the bottom cover 16 is fitted to the bottom surface of the body case 11.

A float valve 24 and a float valve spring 25 are accommodated in the body case 11. The float valve 24 is nearly cylindrically shaped. A valve head 26 is provided on the central portion of the top surface of the float valve 24 in such a way as to protrude therefrom. Referring to this figure together with FIGS. 2 and 3, the valve head 26 is disposed in such a way as to be contacted with and separated from a vent hole 27 defined in the central portion of the top wall 14 of the body case 11. In a peripheral edge portion surrounding the valve head 26 of the float valve 24, plural through holes 28 penetrating therethrough in an upward-downward direction are defined. These through holes 28 permit fuel and fuel vapor to pass therethrough. The float valve spring 25 is interposed between the float valve 24 and the bottom cover 16 and gives an upward pressing force to the float valve 24. Plural through holes 29 are defined in the bottom cover 16. This enables fuel and fuel vapor to pass therethrough.

When not immersed in fuel, the float valve 24 compresses the float valve spring 25 due to its own weight. Thus, the float valve 24 is placed on the bottom cover 16. Subsequently, when the fuel rises and the float valve 24 is immersed in the fuel, the float valve 24 is floated by a buoyant force thereof and a pressing force of the float valve spring 25. Thus, the valve head 26 abuts against and closes the vent hole 27. Parts having been described above constitute the cut valve according to the embodiment of the invention.

Figure 2:
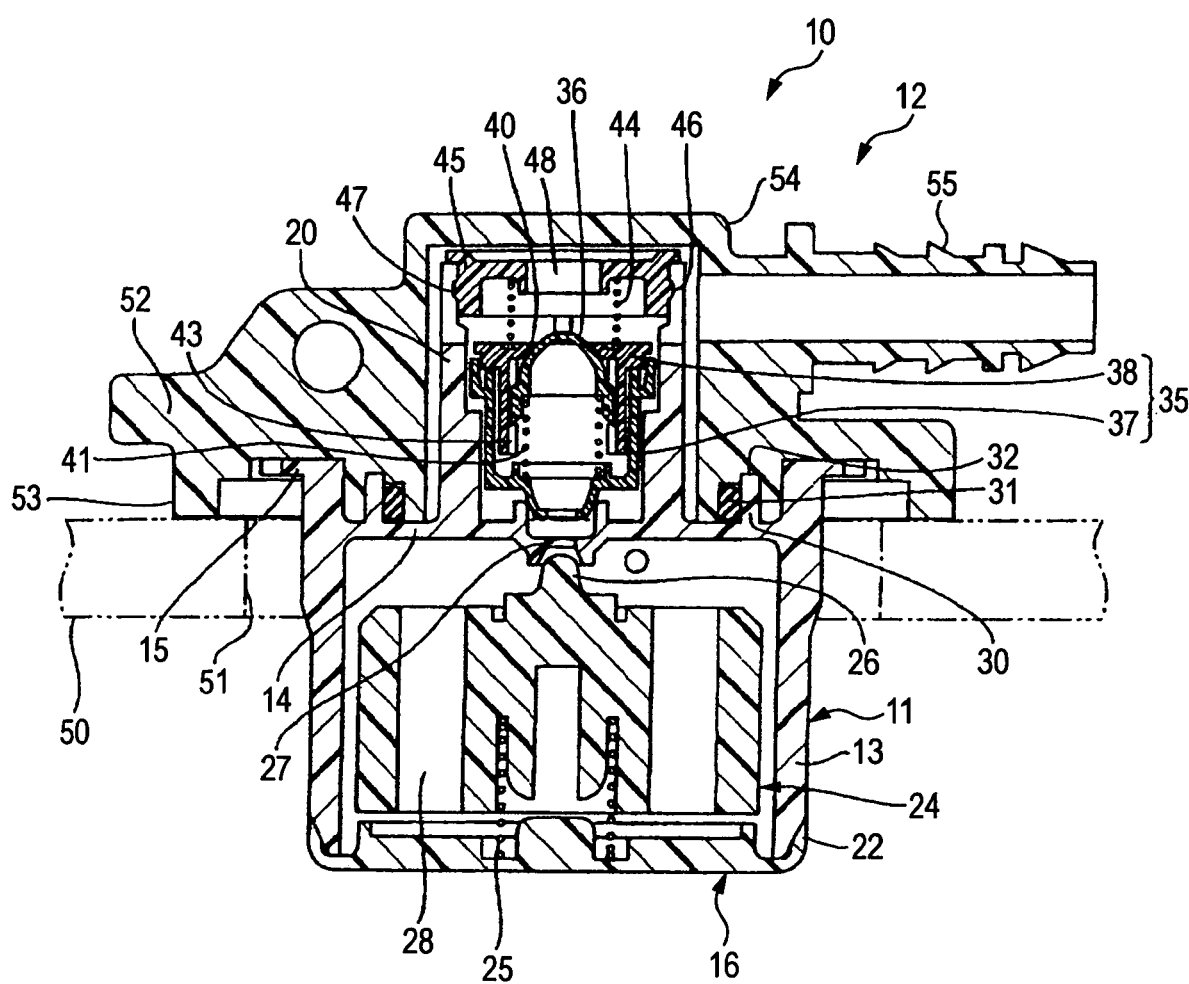
FIG. 2 is a cross-sectional view illustrating the cut valve with the check valve.
Figure 3:
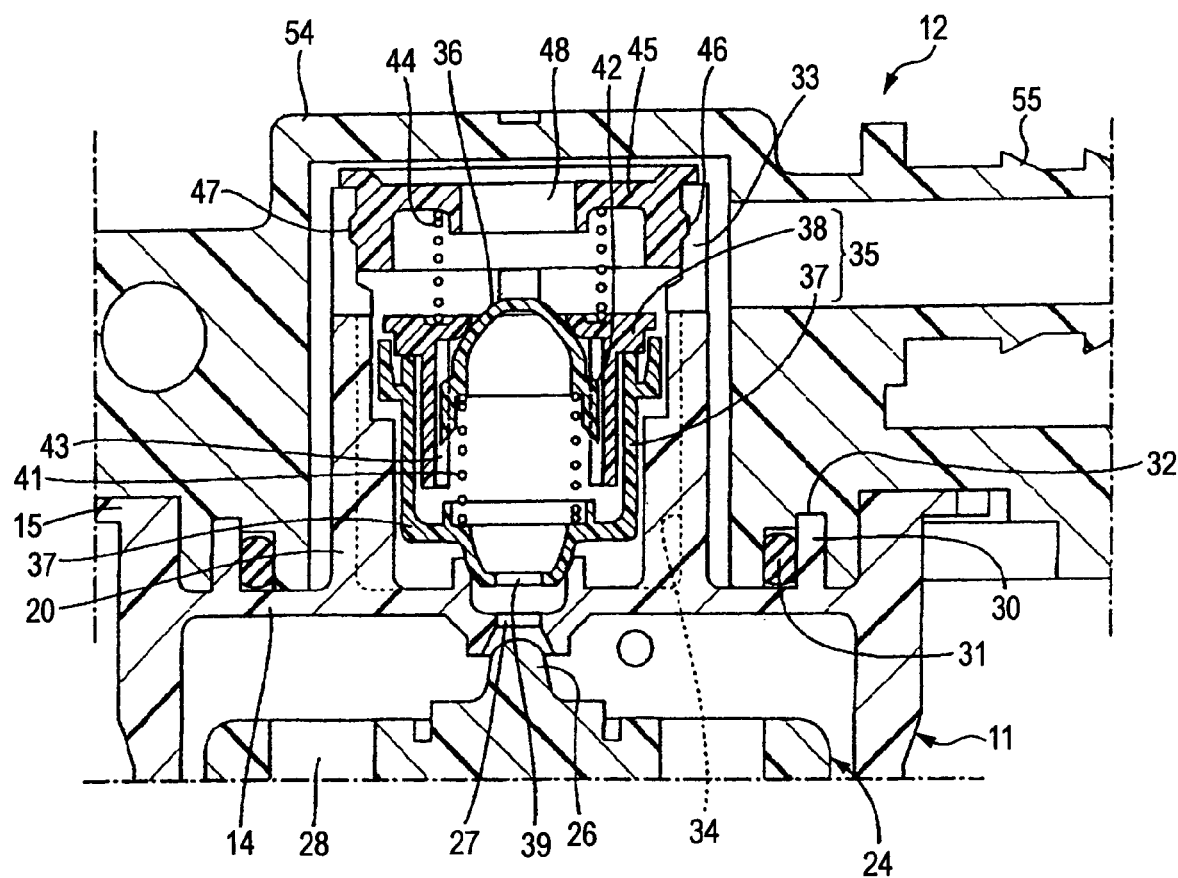
FIG. 3 is a partially cross-sectional view illustrating a state of the cut valve with the check valve, in which the fuel vapor pressure in a fuel tank does not exceed a predetermined value.

On the top wall 14 of the body case 11, an annular rib 30 is formed on the outer periphery of the tube portion 20. Further, a seal ring 31 is disposed along the inner periphery of this annular rib 30. As shown in FIGS. 2 and 3, an annular groove 32 for catching the annular rib 30 of the body case 11 is defined in the bottom surface of the cap member 12. The annular rib 30 of the body case 11 and the seal ring 31, which is disposed along the inner periphery of the annular rib 30, are inserted into the annular groove 32. This seal ring 31 airtightly seals between the cap member 12 and the body case 11.

Plural notch parts 33 are defined in the top part of the tube portion 20 of the body case 11 at predetermined intervals in the circumferential direction thereof. Also, plural guide grooves 34 extending along the axial direction of the tube portion 20 are defined in the inner periphery of the tube portion 20 at predetermined intervals in the circumferential direction thereof.

A positive pressure valve 35 and a negative pressure valve 36 are accommodated in the tube portion 20. The positive pressure valve 35 includes a body portion 37 and a cap portion 38. The body portion 37 has a cylindrical shaped as a whole and is tapered on a bottom surface side. The cap portion 38 is inserted into an opening portion defined in the top surface of this body portion 37 and welded thereto by, for example, ultrasonic welding. A hole 39 is defined in the bottom surface of the body portion 37. An opening part 40 is defined in the top surface of the cap portion 38.

The negative pressure valve 36 is inserted into the body portion 37 of the positive pressure valve 35 with sandwiching a second spring 41 therebetween. The negative pressure valve 36 is configured so that the top surface thereof is contacted with and separated from the opening part 40 of the cap portion 38 from below. On the outer periphery of the negative pressure valve 36, plural guides 42 constituted by ridges extending along the axial direction thereof, respectively, are formed at predetermined intervals in the circumferential direction thereof. These guides 42 are inserted in guide grooves 43 defined in the inner periphery of the body portion 37 of the positive pressure valve 35 and serve to aid upward and downward sliding motions thereof.

The second spring 41 always pushes the negative pressure valve 36 toward the opening part 40 in such a way as to abut thereagainst from below. When the internal pressure of the fuel tank is negative in comparison with an outside pressure, the negative pressure valve 36 is pressed by the outside pressure and moves downwardly against a pressing force of the second spring 41 and serves to open the opening part 40 to thereby suck the external air into the fuel tank.

Thus, the negative pressure valve 36 and the second spring 41 are preliminarily incorporated into the positive pressure valve 35 and set to be a component, which is integral with the positive pressure valve 35. Consequently, it is unnecessary to perform an operation, such as ultrasonic welding, when the product is assembled.

Meanwhile, a first spring 44 is disposed on the positive pressure valve 35. The bottom of the first spring 44 abuts against the cap portion 38 of the positive pressure valve 35, while the top of the first spring 44 abuts against a lid 45 fitted into the top opening part of the tube portion 20.

The lid 45 has an annular convex portion 46 provided on the outer periphery thereof. Also, an opening 48 is defined in the central portion of the top surface of the lid 45. An annular concave portion 47 associated with this convex portion 46 is defined in the inner periphery of the top part of the tube portion 20. Thus, when the lid 45 is inserted into the top opening part of the tube portion 20, the top part of the tube portion 20 is elastically and outwardly spread by the notch parts 33 and catches the lid 45. The annular convex portion 46 is fitted into the annular concave portion 47. Consequently, the lid 45 is fitted to the top opening part of the tube portion 20. Alternatively, the lid 45 may be welded to the top opening part of the tube portion 20 by ultrasonic welding.

Accordingly, the first spring 44 is disposed, with being compressed, between the lid 45 and the top surface of the cap portion 38 of the positive pressure valve 35 at a predetermined distance. The first spring 44 downwardly pushes the positive pressure valve 35 in such a way as to close the vent hole 27. Thus, the lid 45 fitted to the top opening part of the tube portion 20 catches the top of the first spring 44. Consequently, the predetermined distance, at which the first spring 44 is held therebetween, can be controlled in such a way as to be constant. Thus, the pressing force of the first spring 44 can exactly be set.

When the internal vapor pressure of the fuel tank exceeds a predetermined value, the positive pressure valve 35 receives a pressurization force from the vent hole 27 and rises against the pressing force of the first spring 44. The positive pressure valve 35 serves to upwardly discharge fuel vapor through the vent hole 27.

Alternatively, the first spring 44 may be made to directly abut against the inner surface of the cap member 12, without using the lid 45. With this configuration, a check valve including the float valve 24, the positive pressure valve 35 and the negative pressure valve 36 is accommodated in the body case 11. The float valve 24 and the check valve coaxially operate. Thus, high sealability is obtained.

The cap member 12 has a plate portion 52, which is welded to the peripheral edge of an opening portion 51 of a fuel tank 50 shown in FIG. 2 when the cut valve 10 with the check valve is attached to the opening portion 51. That is, an annular rib 53 abutting against the peripheral edge of the opening portion 51 of the fuel tank 50 is formed on the bottom surface of the plate portion 52. In the case of this embodiment, the cap member 12 is made of a material that can be welded to the resin fuel tank 50, for example, an olefin-based resin such as polyethylene or polypropylene.

A case portion 54 being cylindrically expanded is provided on the central part of the top surface of the plate portion 52 of the cap member 12. The tube portion 20 of the body case 11 is accommodated in this case portion 54. Further, a connecting pipe 55 for connecting a pipe to be connected to a canister (not shown) is provided in the peripheral wall of the case portion 54 in such a manner as to protrude therefrom. The connecting pipe 55 is opened in the inner periphery of the case portion 54 and communicates with the vent hole 27 of the body case 11.

Next, an operation of this cut valve 10 with the check valve will be described hereinbelow with reference to FIGS. 3, 4, and 5.

FIG. 3 shows a state in which the vapor pressure in the fuel tank does not exceed a predetermined value. At that time, the positive pressure valve 35 closes the vent hole 27 by utilizing the pressing force of the first spring 44.

Figure 4:
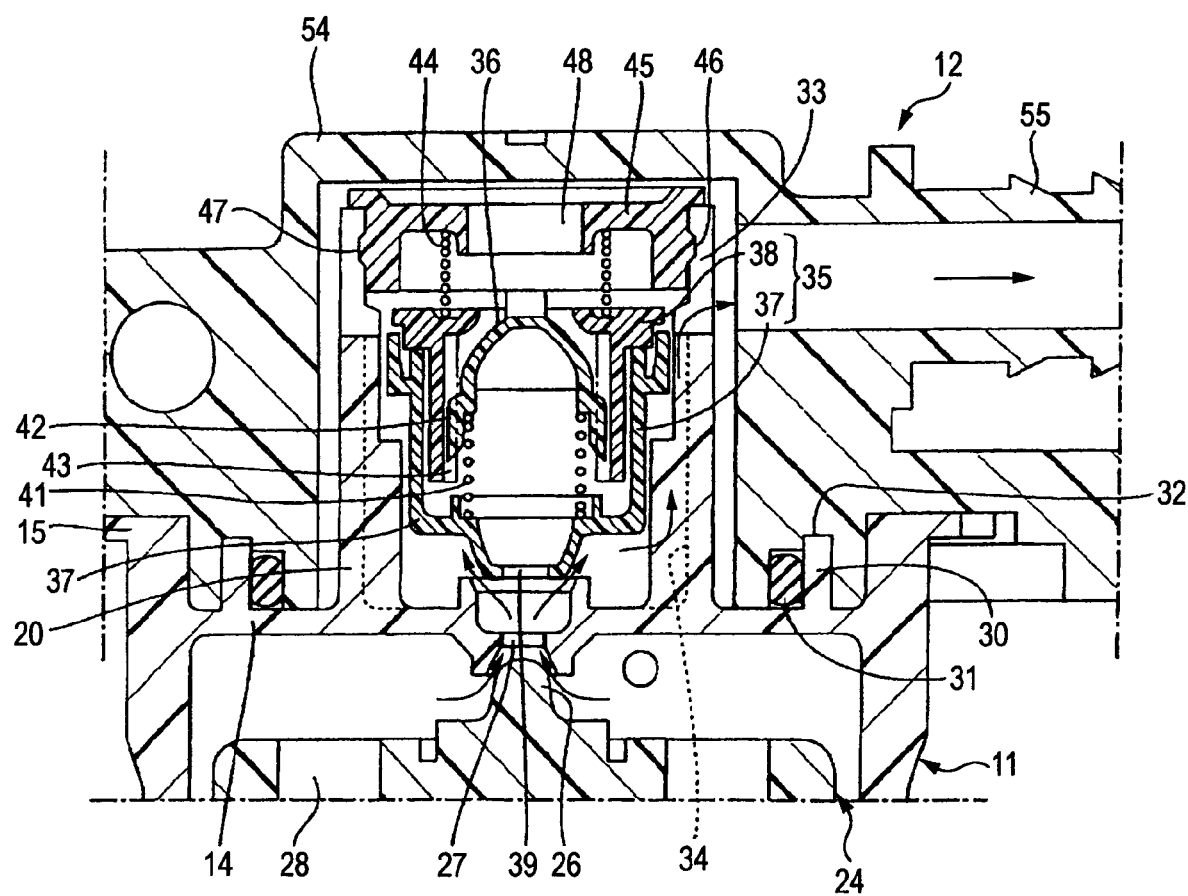
FIG. 4 is a partially cross-sectional view illustrating a state of the cut valve with the check valve, in which the fuel vapor pressure in the fuel tank exceeds a predetermined value.

FIG. 4 shows a state in which the vapor pressure in the fuel tank exceeds the predetermined value. At that time, a fuel-vapor pressure applied to the vent hole 27 causes the positive pressure valve 35 to upwardly move against the pressing force of the first spring 44, so that the vent hole 27 is opened. As indicated by arrows shown in FIG. 4, the fuel vapor passes through the vent hole 27, the outer periphery of the positive pressure valve 35, the notch parts 33 of the tube portions 20, and the opening 48 of the lid 45, and flows into the connecting pipe 55, and sent to the canister (not shown) through the pipe (not shown). In this case, the guide grooves 34 are defined in the inner periphery of the tube portion 20. Also, the notch parts 33 are defined in the top part of the tube portion 20. Thus, the cross-section of a vent passage, through fuel vapor passes, is set to be large. Consequently, this embodiment offers the advantage that a ventilating pressure loss is small.

Figure 5:
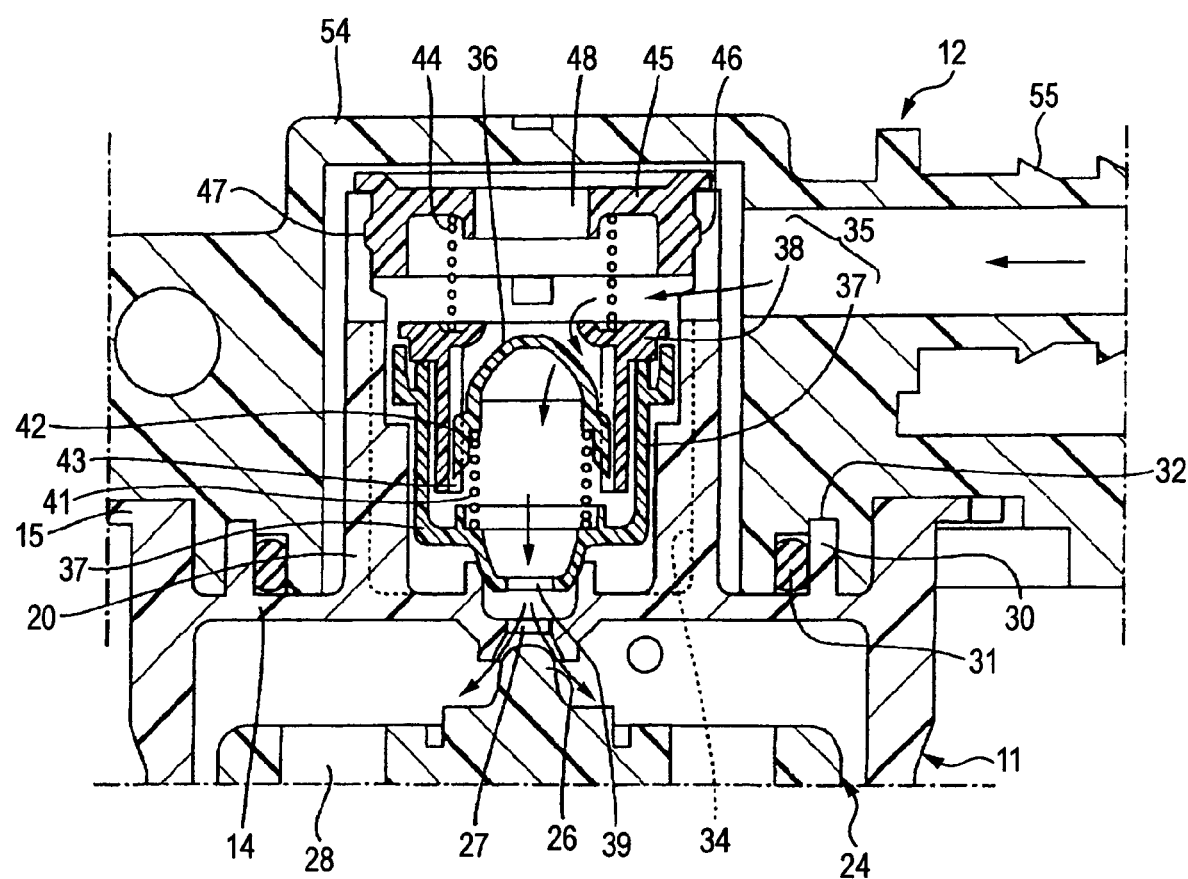
FIG. 5 is a partially cross-sectional view illustrating a state of the cut valve with the check valve, in which the fuel vapor pressure in the fuel tank is a negative pressure lower than an outside pressure by a predetermined value.

FIG. 5 shows a state in which the vapor pressure in the fuel tank is lower than the outside pressure by a predetermined value. At that time, the pressing force of the first spring 44 causes the positive pressure valve 35 to abut against the peripheral edge of the vent hole 27. However, the outside pressure is applied to the negative pressure valve 36 through the opening portion 40 defined in the cap portion 38 of the positive pressure valve 35. Thus, the negative pressure valve 36 downwardly moves against the pressing force of the second spring 42, so that the opening portion 40 is opened.

Consequently, as indicated by arrows shown in FIG. 5, outside air coming from the canister passes through the connecting pipe 55, the notch parts 33 of the tube portion 20, the opening 48 of the lid 45, and the opening portion 40 of the positive pressure valve 35 and flows into the positive pressure valve 35. Then, the outside air passes through the hole 39 defined in the bottom of the positive pressure valve 35 and the vent hole 27 and is supplied to the fuel tank. Consequently, the negative pressure in the fuel tank is corrected, so that the fuel tank can be prevented from undergoing deformation or the like.

In the cut valve with the check valve according to the embodiment of the invention, the positive pressure valve 35 and the negative pressure valve 36 are formed of synthetic resins, and are neither swelled nor deteriorated by fuel, differently from synthetic rubbers that are swelled and deteriorated by fuel. Thus, stable performance can be maintained over a long period of time. Further, the cut valve with the check valve according to the embodiment of the invention employs a structure in which the cap member 12 is attached to the body case 11 through the seal ring 31. Thus, an assembling operation can easily be performed. Also, since the cap member 12 is made of a material that is weldable to the fuel tank 50, an operation of attaching the cap member 12 to the fuel tank 50 can be facilitated.

Figure 6:
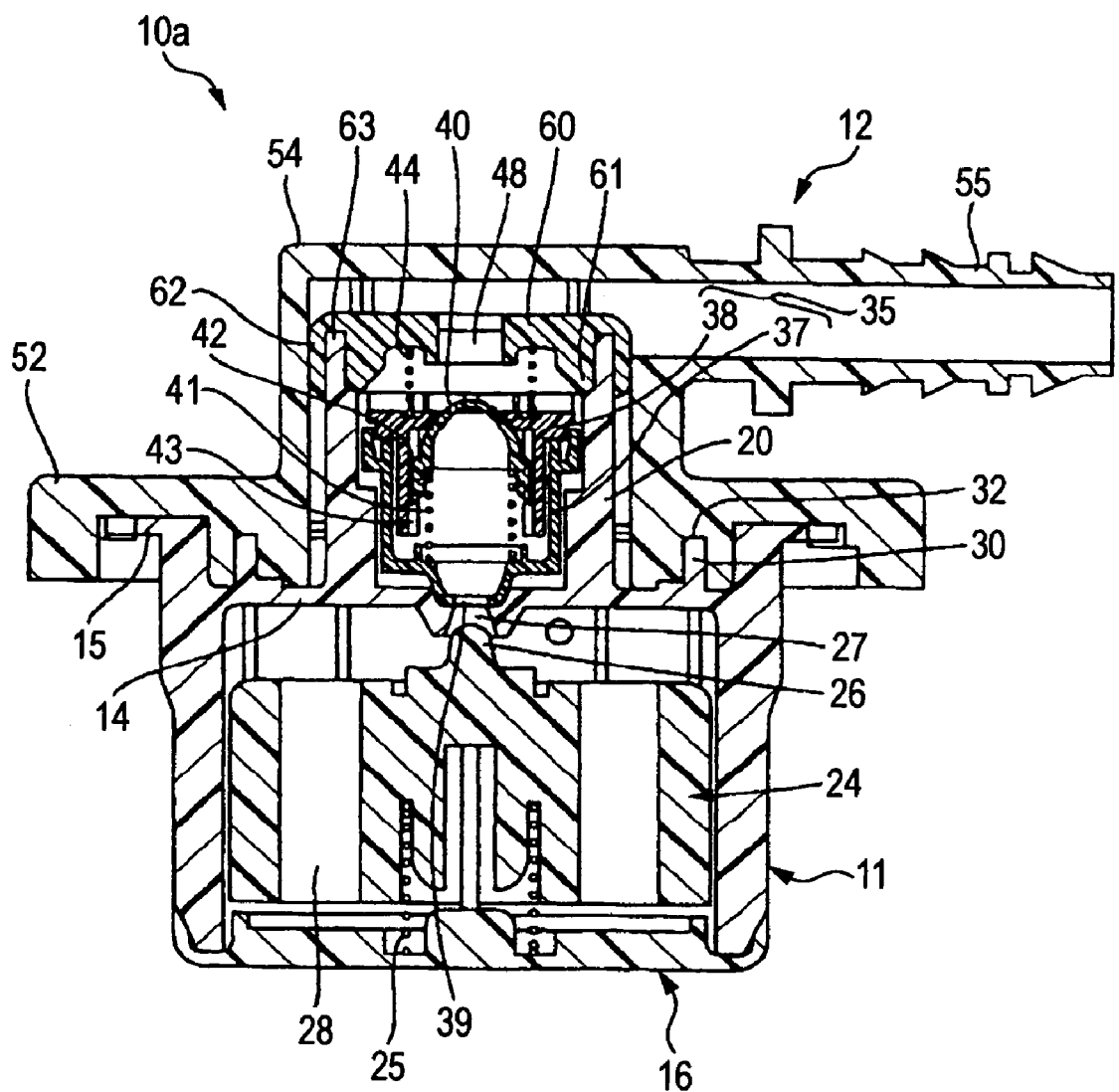
FIG. 6 is a cross-sectional view illustrating a cut valve with a check valve according to another embodiment of the invention.

FIG. 6 shows a cut valve with a check valve according to another embodiment of the invention. Incidentally, constituent components of the embodiment described in the following description, which are substantially the same as those of the embodiment shown in FIGS. 1 to 5, will be designated by the same reference numerals. Thus, the description of such constituent components will be omitted herein.

Basically, this cut valve 10a with a check valve has a configuration similar to that of the embodiment shown in FIGS. 1 to 5.

A difference therebetween resides in that a lid 60 attached to the top surface of the tube portion 20 of the body case 11 is formed of an elastomer such as a rubber. Especially, a synthetic rubber, such as a fluorocarbon rubber, is preferable. That is, the lid 60 made of a synthetic rubber includes an insertion cylinder portion 61 on the bottom surface thereof, a rim portion 62, and an annular groove defined therebetween. The insertion cylinder portion 61 is inserted into the inner periphery of the tube portion 20. The rim portion 62 covers the outer periphery of the top of the tube portion 20.

Further, the top of the tube portion 20 is inserted into the annular groove 63. Consequently, the lid 60 is attached to the top part of the tube portion 20. Incidentally, this cut valve 10a with the check valve is similar to that of the aforementioned embodiment in that the opening 48 is defined in the central portion of the top surface of the lid 60.

Further, as shown in FIG. 6, the outer periphery of the lid 60 made of the synthetic resin, namely, the outer periphery of the rim portion 62 is in elastically close contact with the inner periphery of the case portion 54 of the cap member 12 and airtightly seals between the tube portion 20 and the inner periphery of the case portion 54. Consequently, in the case where the vapor pressure in the fuel tank exceeds the predetermined value, an out flow channel through which fuel vapor passes is set to be a passage in which the fuel vapor passes through the vent hole 27, the outer periphery of the positive pressure valve 35, and the opening 48 of the lid 60 and flows into the inner periphery of the connecting pipe 55.

Thus, the lid 60 is formed of a synthetic rubber to thereby enable this embodiment to also have an effect of sealing between the body case 11 and the cap member 12. Consequently, the number of components can be reduced. Also, the manufacturing cost of components can be reduced.

Figure 7:
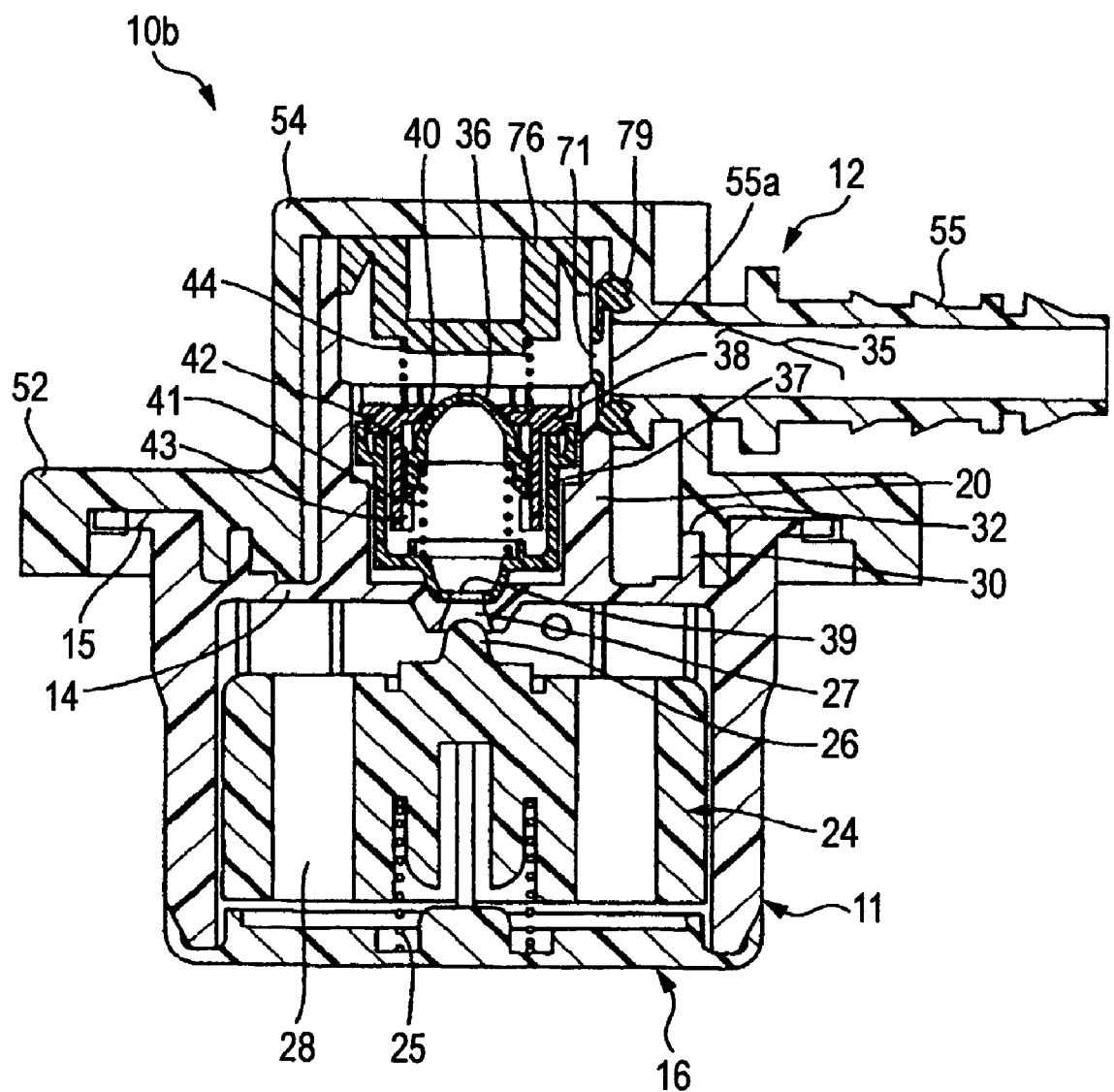
FIG. 7 is a cross-sectional view illustrating a cut valve with a check valve according to still another embodiment of the invention.
Figure 8:
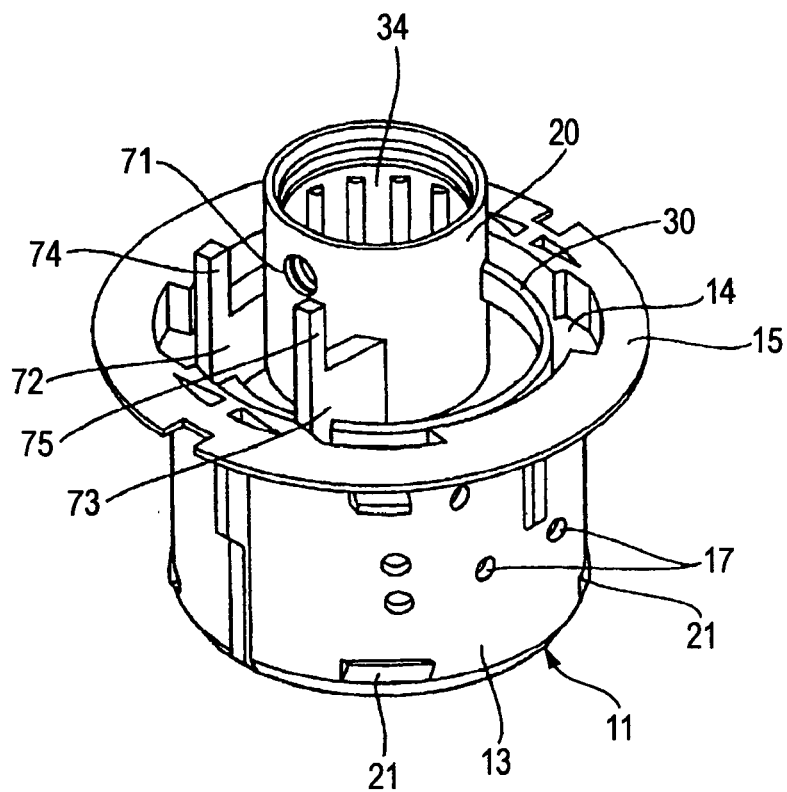
FIG. 8 is a perspective view illustrating a body case of the cut valve with the check valve.
Figure 9:
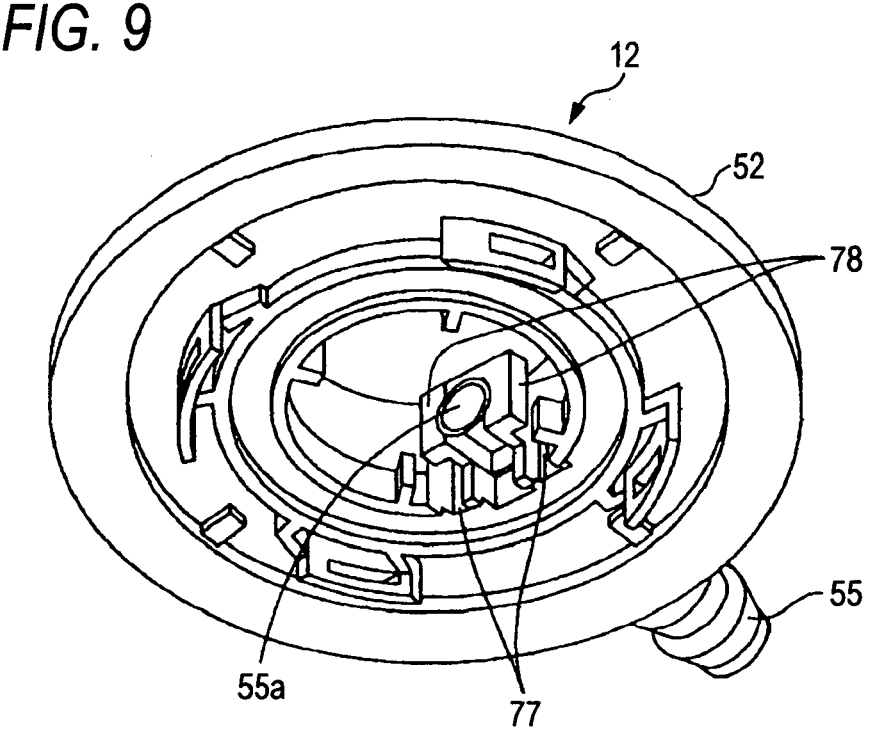
FIG. 9 is a perspective view illustrating a cap member of the cut valve with the check valve.

FIGS. 7 to 9 show still another embodiment of the invention. A cut valve 10b with a check valve differs from the aforementioned embodiments in the shapes of the peripheries of the tube portion 20 of the body case 11 and the cap member 12.

That is, the tube portion 20 defines a communication hole 71 at a place in the peripheral wall thereof. Paired boards 72 and 73 are extended from both sides of this communication hole 71 nearly in parallel with each other in an outward direction of the tube portion 20. Arm members 74 and 75 are erected on the boards 72 and 73 in such a way as to upwardly protrude from end portions of the boards 72 and 73, respectively. Further, a cap 76 fitted to the top surface of the tube portion 20 is shaped in such a way as to completely close the tube portion 20.

Meanwhile, an opening portion 55a communicating with the connecting pipe 55 is defined in the inner periphery of the case portion 54 of the cap member 12. Further, paired insertion grooves 77, into which the arm members 74 and 75 protruding from the top surface of the body case 11 are inserted, are defined in the peripheral edge of this opening portion 55a. Furthermore, paired flanges 78 extended from both sides of the opening portion 55a are provided in such a way as to constitute the inner peripheral side portion of these insertion grooves 77. Therefore, when the cap member 12 is assembled to the body case 11, the arm members 74 and 75 are engaged with the flanges 78, respectively, by inserting the arm members 74 and 75 into the insertion grooves 77 of the cap member 12. Thus, the gap between the inner periphery of the case portion 54 of the cap member 12 and the outer periphery of the tube portion 20 of the body case 11 is maintained at a constant value.

Also, a seal ring 79 for sealing the peripheral edges of the communication hole 71 defined in the peripheral wall of the tube portion 20 and the opening portion 55a defined in the inner periphery of the cap member 12 is disposed in the gap between the communication hole 71 and the opening portion 55a. Thus, the body case 11 and the cap member 12 are airtightly sealed by the seal ring 79. This seal ring 79 has only to have a size sufficient to the extent that the seal ring 79 surrounds the opening portion 55a of the connecting pipe 55. Consequently, the cost of the material can significantly be reduced.

Incidentally, although the entire cap member 12 is made of the material weldable to the resin fuel tank in the embodiments described above, the cap member 12 may be formed so that only the peripheral edge portion of the bottom surface of the plate portion 52 thereof is formed of the material weldable to the resin fuel tank by, for example, insert molding, and that the rest of the cap member 12 may be made of a material differing from that of the resin fuel tank, for instance, polyacetal or polyamide.

The valve according to the embodiments of the invention can be used as a cut valve with a check valve attached to a fuel tank of an automobile. The cut valve with the check valve integrally includes a cut valve for preventing fuel, which is shaken by a turn and a tilt of the automobile, from leaking out of the tank, and a check valve for feeding fuel vapor to a canister according to the internal pressure of the tank.

What is claimed is:

1. A cut valve with a check valve, the cut valve comprising:

a body case that defines a vent hole and accommodates therein a float valve for opening and closing the vent hole;

a cap member that is fitted to an upper portion of the body case and includes a connection pipe communicating with the vent hole and protruding from an outer wall thereof;

a positive pressure valve that comprises resin, defines an opening part, and is disposed to be contactable with and separable from the vent hole from above;

a first spring that is disposed on the positive pressure valve and presses the positive pressure valve in a direction in which the positive pressure valve closes the vent hole;

a negative pressure valve that comprises resin and is disposed to be contactable with and separable from the opening part of the positive pressure valve from below;

a second spring that presses the negative pressure valve in a direction in which the negative pressure valve closes the opening part of the positive pressure valve; and a lid that receives the first spring, wherein:

the body case includes a cylindrical tube portion that is erected on an upper surface of the body case to surround the vent hole;

the positive and negative pressure valves are accommodated in the tube portion; and the lid is attached to an upper end of the tube portion.

2. The cut valve with the check valve according to claim 1, wherein a plurality of notch portions are defined in the upper end of the tube portion at intervals in a circumferential direction.

3. The cut valve with the check valve according to claim 1, wherein:

the lid comprises elastomer; and the lid airtightly seals a gap between an outer periphery of the tube portion and an inner periphery of the cap member.

4. The cut valve with the check valve according to claim 1, further comprising:

a seal member, wherein:

the lid closes the upper end of the tube portion;

the tube portion defines a communication hole in a peripheral wall thereof to communicate with an opening part of the connection pipe of the cap member; and the seal member seals a peripheral edge between the communication hole of the tube portion and the opening part of the connection pipe.

5. The cut valve with the check valve according to claim 4, wherein:

the body case includes an arm member, which protrudes from the upper surface thereof, on an outer side of the communication hole of the tube portion;

an inner periphery of the cap member defines an insertion groove to which the arm member is inserted; and when the arm member is inserted into the insertion groove, the seal member closely contacts with the peripheral edge of the communication hole of the tube portion and the peripheral edge of the opening part of the connection pipe.

* * * * *